United States Patent
Wang et al.

(10) Patent No.: US 9,715,376 B2
(45) Date of Patent: Jul. 25, 2017

(54) ENERGY/PERFORMANCE WITH OPTIMAL COMMUNICATION IN DYNAMIC PARALLELIZATION OF SINGLE THREADED PROGRAMS

(75) Inventors: Cheng Wang, Cupertino, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1721 days.

(21) Appl. No.: 12/344,721

(22) Filed: Dec. 29, 2008

(65) Prior Publication Data
US 2010/0169861 A1    Jul. 1, 2010

(51) Int. Cl.
G06F 9/44    (2006.01)
G06F 9/45    (2006.01)

(52) U.S. Cl.
CPC ............ *G06F 8/443* (2013.01); *G06F 8/41* (2013.01); *G06F 8/445* (2013.01); *G06F 8/457* (2013.01)

(58) Field of Classification Search
CPC .  G06F 8/443; G06F 8/457; G06F 8/41; G06F 8/445
USPC ....................................................... 717/110
See application file for complete search history.

(56) References Cited

U.S. PATENT DOCUMENTS

| | | | | |
|---|---|---|---|---|
| 5,923,883 A | * | 7/1999 | Tanaka | G06F 8/443 712/220 |
| 8,181,168 B1 | * | 5/2012 | Lee | G06F 8/445 717/149 |
| 2005/0134587 A1 | * | 6/2005 | Geiger | G06K 9/342 345/423 |
| 2006/0015547 A1 | * | 1/2006 | Kuszmaul | G06F 7/506 708/200 |
| 2007/0061286 A1 | * | 3/2007 | Liu | G06F 9/45525 |
| 2009/0043620 A1 | * | 2/2009 | Lee | G06F 8/443 717/144 |

* cited by examiner

*Primary Examiner* — Wei Zhen
*Assistant Examiner* — Mohammed Huda
(74) *Attorney, Agent, or Firm* — Trop Pruner & Hu, P.C.

(57) ABSTRACT

A method and apparatus for optimizing parallelized single threaded programs is herein described. Code regions, such as dependency chains, are replicated utilizing any known method, such as dynamic code replication. A flow network associated with a replicated code region is built and a minimum cut algorithm is applied to determine duplicated nodes, which may include a single instruction or a group of instructions, to be removed. The dependency of removed nodes is fulfilled with inserted communication to ensure proper data consistency of the original single-threaded program. As a result, both performance and power consumption is optimized for parallel code sections through removal of expensive workload nodes and replacement with communication between other replicated code regions to be executed in parallel.

18 Claims, 8 Drawing Sheets

ENERGY/PERFORMANCE WITH OPTIMAL COMMUNICATION IN DYNAMIC PARALLELIZATION OF SINGLE THREADED PROGRAMS

FIELD

This invention relates to the field of execution of code in computer systems and, in particular, to parallelizing execution of code in computer systems.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of processing elements, such as cores, hardware threads, or logical processors.

The ever increasing number of processing elements on integrated circuits enables more software threads to be executed. However, many single-threaded applications still exist, which utilize a single processing element, while wasting the processing power of other available processing elements. Alternatively, programmers may create multi-threaded code to be executed in parallel. However, the multi-threaded code may not be optimized for a number of available processing elements. In either case, once code is replicated for parallel execution, duplicated instructions may be executed on multiple processing elements, which potentially results in minimal performance achievement and an increase in power/energy consumption.

BRIEF DESCRIPTION OF THE DRAWINGS

The present invention is illustrated by way of example and not intended to be limited by the figures of the accompanying drawings.

FIG. 3a illustrates an embodiment of an exemplary code section.

FIG. 3b illustrates an embodiment of a dependence graph for the exemplary code section depicted in FIG. 3a.

FIG. 3c illustrates an embodiment of a dependence graph for parallelizing the exemplary code section depicted in FIG. 3a.

DETAILED DESCRIPTION

In the following description, numerous specific details are set forth such as examples of specific algorithms for identifying dependence chains, expressing paths between instructions, expressing edges between nodes of a flow network, determining workload cost and communication overhead for different nodes in order to provide a thorough understanding of the present invention. It will be apparent, however, to one skilled in the art that these specific details need not be employed to practice the present invention. In other instances, well known components or methods, such as multi-processing parallel execution, specific compiler or other instruction insertion, code replications techniques, and other specific operation details, have not been described in detail in order to avoid unnecessarily obscuring the present invention.

The method and apparatus described herein are for optimizing parallelized code to improve energy and performance. Specifically, optimization of parallelized code is primarily discussed in reference to single-threaded applications that involve dynamic code replication. However, the methods and apparatus for optimizing parallelized code are not so limited, as they may be implemented in associated with any code, such as dependent chains within a multi-threaded program or other code including duplicated instructions/operations to be executed on multiple processing elements.

Figure 1:
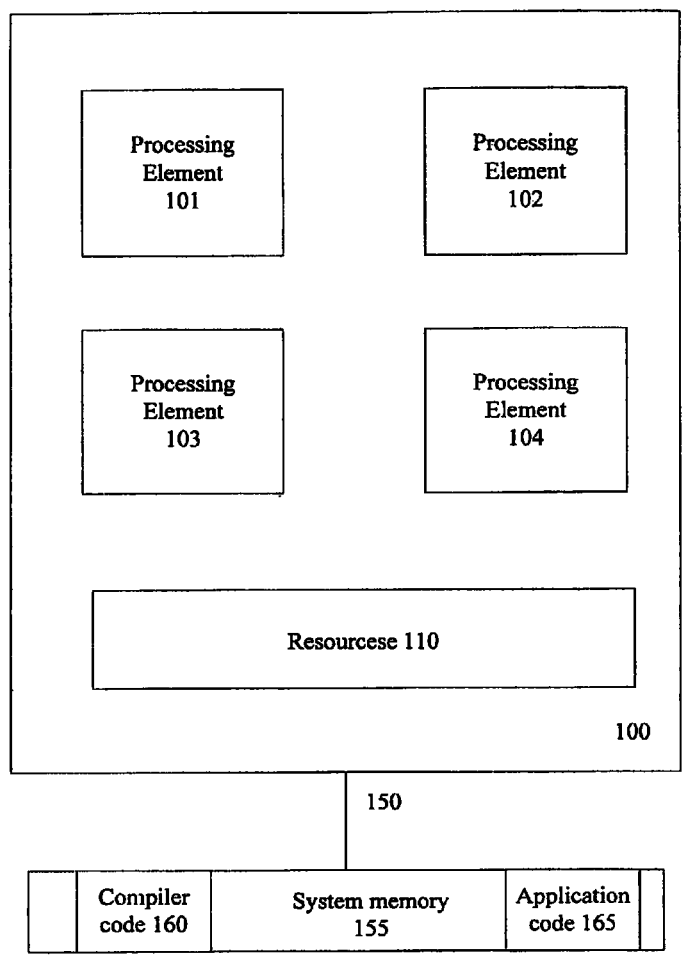
FIG. 1 illustrates an embodiment of a processor including multiple processing elements capable of executing multiple software threads concurrently.

Referring to FIG. 1, an embodiment of a processor capable of executing code regions in parallel is illustrated. Processor 100 includes any processor, such as a micro-processor, an embedded processor, a digital signal processor (DSP), a network processor, or other device to execute code. As illustrated, processor 100 includes four processing elements 101-104; although, any number of processing elements may be included in processor 100.

A processing element refers to a thread unit, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. As an example, a physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. Therefore, as can be seen, multiple software threads, such as multiple replications of a single-threaded application, in one embodiment, are capable of being executed in parallel on multiple processing elements, which may include a combination of any of the aforementioned processing elements, such as cores or hardware threads.

Also illustrated in processor 100 are resources 110, which typically include registers, units, logic, firmware, memory, and other resources to execute code. As stated above, some of resources 110 may be partially or fully dedicated to processing elements, while others are shared among processing elements. For example, smaller resources, such as instruction pointers and renaming logic may be replicated for threads. Some resources, such as re-order buffers in a reorder/retirement unit, instruction lookaside translation buffer (ILTB), load/store buffers, and queues may be shared through partitioning. Other resources, such as general purpose internal registers, page-table base registers, data-cache, a data-TLB, execution unit(s), and an out-of-order unit are potentially fully shared among threads. In contrast, cores may have dedicated execution resources, while sharing at least a portion of a higher level cache, such as a second level cache (L2).

Processor 100 is coupled to system memory 155 through interconnect 150. Often, processors, such as a microprocessor, are coupled in a computer system in different configurations. For example, in one embodiment, processor 100 is coupled to a chipset, which includes an input/output (I/O) hub and a memory controller hub disposed between processor 100 and system memory 155. As a result, for the discussion in regards to system memory 155, processor 100 may be coupled to system memory 155 in any manner.

In one embodiment, program code, such as compiler code 160 held in system memory 155, when executed, is to replicate a code region/section of application code 165. As an illustrative example, a code region/section may be replicated an optimal number of times for maximum parallelization of the code/section, which are discussed in more detail in co-pending application having application Ser. No. 12/139,647 entitled, "Optimal Code Replication for Improving Parallelism in Single-Threaded Programs." However, any method of static or dynamic code replication may be utilized before optimizations are performed as described below.

In one embodiment, parallelized code is optimized for improved performance and power/energy consumption. As an example, parallelized code includes code duplicated or replicated. However, when a portion or region of code, such as a dependence chain of a single-threaded program, is replicated, nodes/instructions may be duplicated. Although the duplication increases parallelization and potentially reduces overall execution time, removal of some duplicated instructions and replacement by communication to ensure proper ordering and data consistency may both improve performance and reduce power/energy consumption.

Therefore, in one embodiment, optimization of parallelized code includes determining a duplicated node/instruction within the parallelized code to remove and replace with communication. For example, assume a sub-dependence chain from a single-threaded program is replicated by a factor of two, such that the first replicated dependence chain is to be executed on processing element 101 and the second dependence chain is to be executed on processing element 102. Instead of executing a duplicated instruction on both processing elements 101 and 102, in this example, the duplicated instruction is removed from the first dependence chain, such that the instruction is executed only on processing element 102.

Furthermore, if a second instruction in the first dependence chain depends on, i.e. utilizes results from, the first removed instruction, then communication operations are inserted to communicate the results of execution of the first instruction on processing element 102 to the second instruction executing on processing element 101. As a result, the data dependencies between instructions are maintained through communication, while execution performance and power consumption of processing element 101 is optimized through removal of duplicated instructions.

In one embodiment, nodes/instructions within a code are determined to be removed based on a minimum-cut algorithm, which may also be referred to a maximum flow algorithm. As an example, cost of executing instructions, i.e. workload cost, in conjunction with cost of removing instructions and replacing with communication, i.e. communication cost, are evaluated to determine a minimum cost of removal, i.e. maximum performance gain in removing instructions. Consequently, the most optimized version of a code region may be obtained through a balance of the workload cost of executing an instruction as compared to a communication cost associated with removing the instruction. A minimum-cut algorithm is discussed in more detail below.

In one embodiment, the determination to remove instructions may be done at any time. As a first example, the determination is made during any phase of either static compilation or dynamic compilation, such as execution of compiler code 160 to compile and/or optimize application code 165. In fact, any of the methods, flows, and/or operations discussed herein may be performed in response to operations/instructions inserted by a compiler. A compiler, such as compiler code 160, often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle end, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially determines nodes to remove in one phase of compilation, and then removed the nodes and insert communication operations in other phases.

In one embodiment, a compiler dynamically compiles code in a runtime environment, such as a Just In Time (JIT) compiler in Java™ from Sun Corporation. Often, this type of compilation is referred to as dynamic compilation, i.e. compilation during runtime. In addition, Java™ from Sun Corporation is typically referred to as managed code, i.e. an abstraction level between physical hardware and software code often referred to as a virtual machine capable of running on multiple different physical/native machines. However, dynamic compilation may also refer to partial program analysis/compilation, i.e. where the compiler does not have the entire section of code available to perform analysis during compilation. In contrast, whole program analysis or pre-compilation before runtime execution is typically referred to as static compilation. In addition to a managed environment, a compiler may also compile program code to run in a native environment, such as compilation into x86 code to be executed on Intel architecture processors.

However, processor 100 executing "program code," to perform any operations, such as optimizing parallelized code, may refer to execution of any code, such as optimization application code, a library, a compiler, other code, or a combination thereof. As an example, compiler 160 is executed to compile application code 165, which in this example, may include a single threaded application. During compilation, either statically or dynamically, a sub-dependence chain is replicated into replicated dependence chains. The replicated dependence chains may be assigned to processing elements 101-104, respectively. Furthermore, either compiler 160 or other optimization code may then be executed to optimize a replicated dependence chain.

Figure 2:
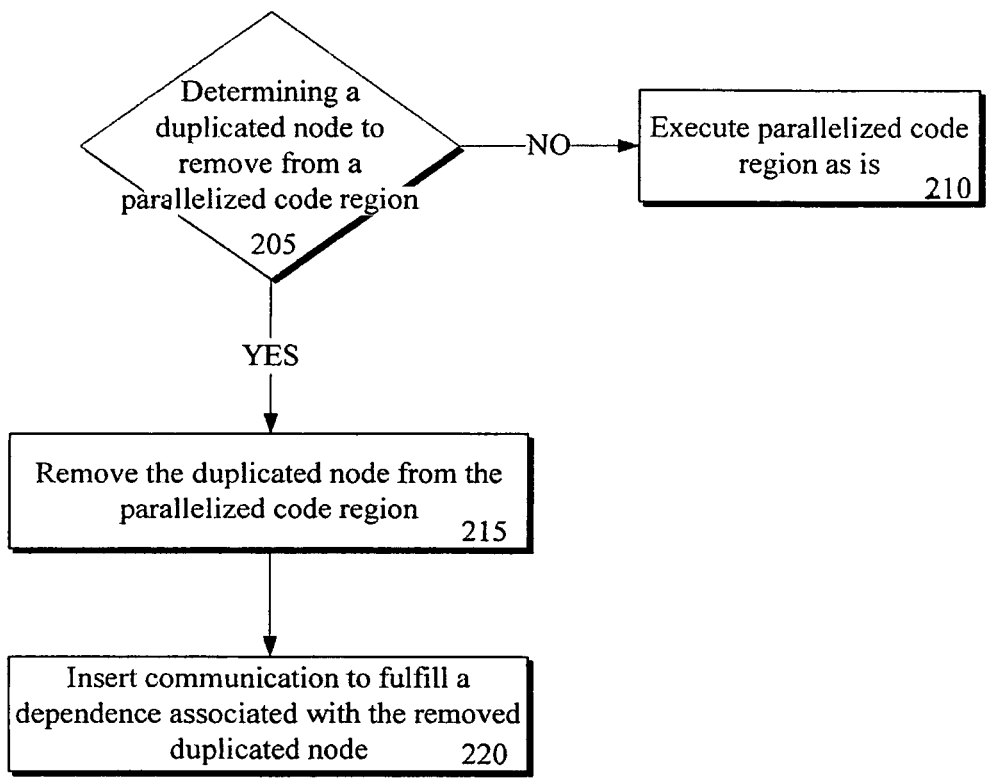
FIG. 2 illustrates an embodiment of a flow diagram for a method of optimizing parallelized code.
Figure 4:
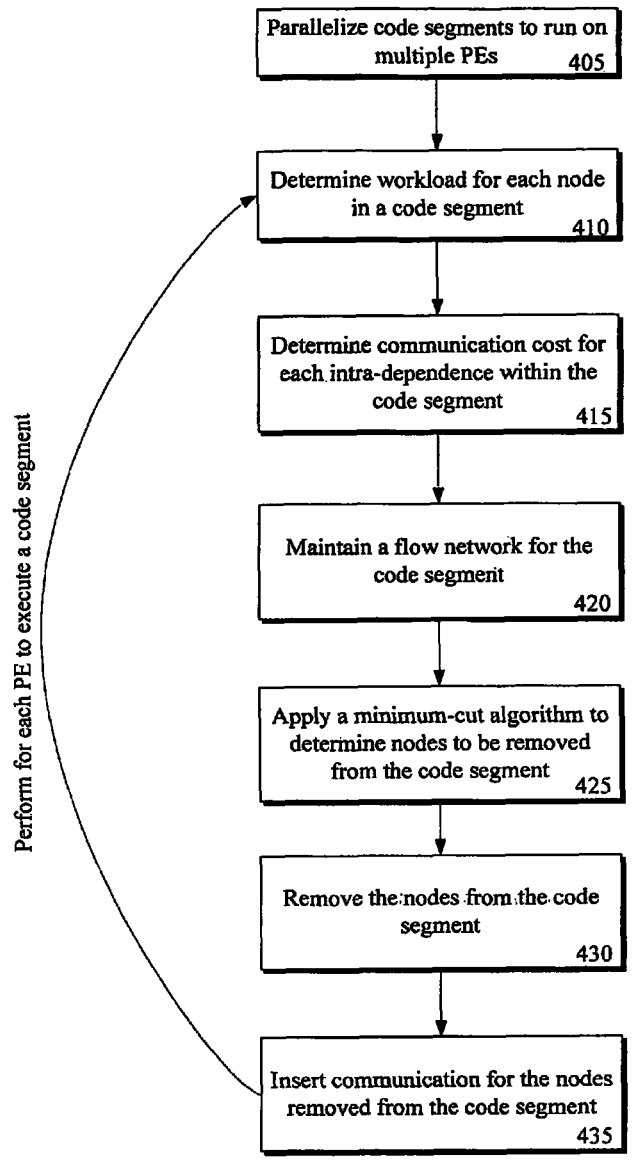
FIG. 4 illustrates an embodiment of a flow diagram for optimizing a parallelized code segment.
Figure 5:
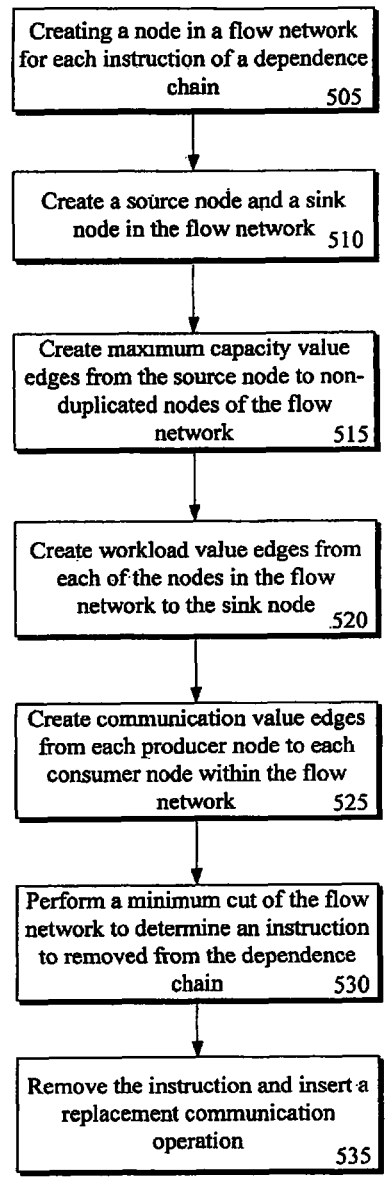
FIG. 5 illustrates an embodiment of a flow diagram for maintaining a flow network for a dependence chain.

Turning to FIG. 2, an embodiment of a flow diagram for a method of optimizing parallelized code is illustrated. Although FIGS. 2, 4, and 5 are shown in a substantially serial fashion, performance of the flows be done in any order, or not at all in some embodiments, as well as performed partially or wholly in parallel. For example, connection of nodes may take place in any manner, such as creation of communication edges before creation of workload edges. Additionally, in other embodiments, additional flows may be performed.

In flow 205, a duplicated node is determined to be removed from a parallelized code region. Parallelized code includes any code to be executed concurrently, i.e. in parallel. As an illustrative example, a parallelized code region includes a replicated code region, such as a replicated dependence chain. A potential implementation for this replication is in the realm of parallelizing single threaded programs. Here, dependence chains of the single-thread program are replicated to be executed independently in parallel on separate processing elements.

Figures 3A, 3B:
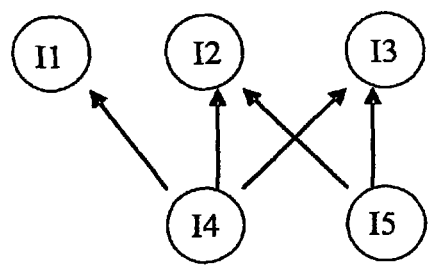

Additionally, a node includes any portion of code, such as a single operation, single instruction, a group of instructions, a dependence chain, a sub-dependence chain, a branch, a loop, or a region of code. For example, as a quick interlude to FIG. 3b, a dependence graph for the code segment of FIG. 3a is illustrated. Here, the dependence graph includes a node for each instruction of the code segment. However, in another example, each node of the dependence graph may include a sub-dependence chain with multiple instructions. In other words, for simplicity, single instructions per node are discussed below to illustrate the flow of FIG. 2; however, in more complex embodiments, similar optimizations may be performed with higher level abstraction of nodes, i.e. nodes including multiple instructions.

Figure 3C:
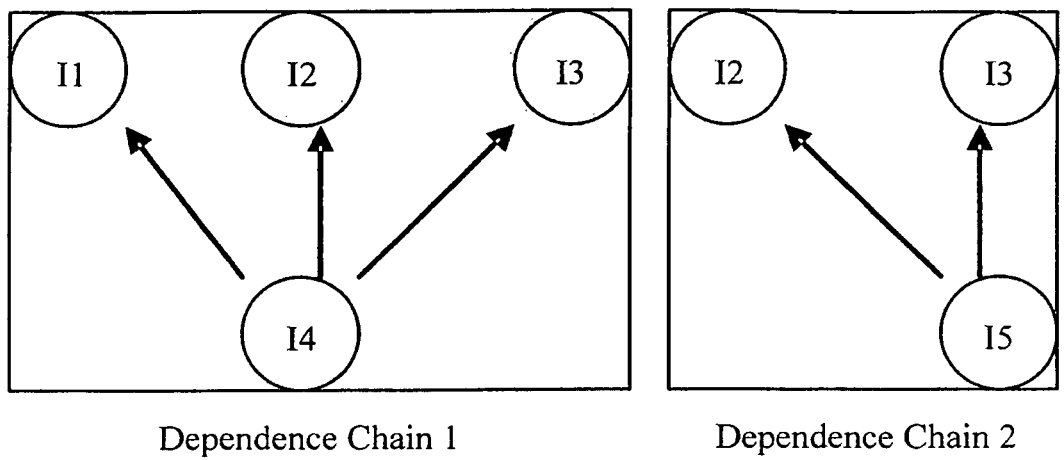

As can be seen from the combination of FIG. 3a and FIG. 3b, instruction I4 depend from instructions I1, I2, and I3. Furthermore, instruction I5 also depend from instructions I2 and I3. Therefore, the code segment may be replicated, i.e. divided, into two dependence chains, as illustrated in FIG. 3c, which start from instructions I4 and I5, respectively. Here, if the first and second dependence chains are executed in parallel on separate processing elements, such as separate cores, instructions I2 and I3 are executed on both cores.

In one embodiment, during analysis or optimization of a code region, such as dependence chain 1 in FIG. 3c, a duplicated node, such as instruction I2 or I3, is determined to be removed. As one example, the determination of a node to remove from dependence chain 1 is based on a flow network associated with the first parallelized code region. Although a flow network is discussed in more detail below in reference to FIGS. 4, 5, and 6c, a brief illustrative discussion is inserted at this point to further the discussion. Here, a flow network includes a tool to track workloads of nodes and communication costs between nodes if removed from a code segment. In one embodiment, a minimum-cut algorithm is utilized in conjunction with the flow network to determine nodes to be removed from dependence chain 1.

For example, edges between nodes of the flow network for dependence chain 1 are associated with capacity values. Examples of the capacity values include a large default value for non-duplicated nodes, such as instruction I1 and I4, of dependence chain 1, a communication cost between a producer node, such as node I3, and a consumer node, such as I4, of dependence chain 1, and a workload for the nodes of the dependence chain 1. The minimum cut, in one embodiment, includes performing a cut through these edges of the flow network, such that the cut forms a minimum summation of capacity values associated with edges that are sliced by the cut.

Figure 3D:
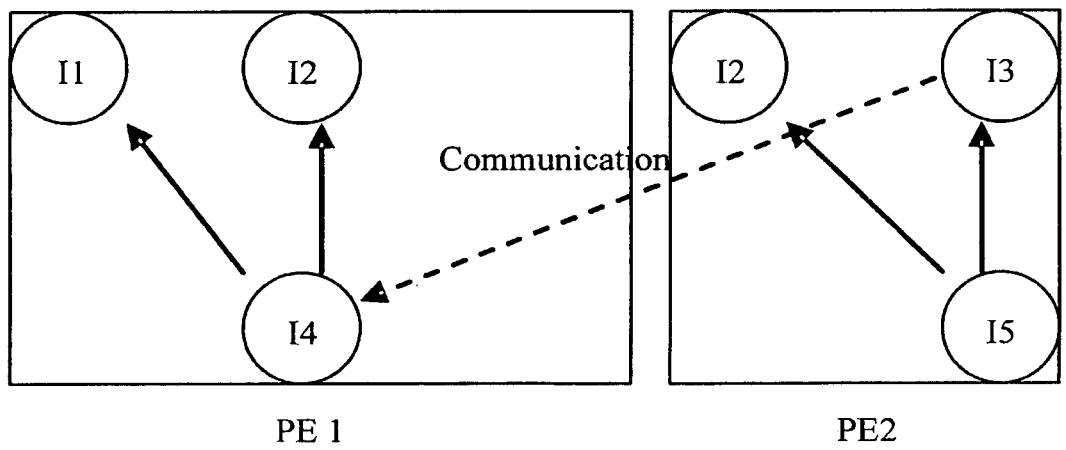
FIG. 3d illustrates an embodiment of an exemplary dependence graph for optimizing a parallelized code region of the dependence graph of FIG. 3c.

If no node is determined to be removed, then in flow 210 of FIG. 2, the parallelized code region, such as dependence chain 1, is executed as is. However, in the example of FIGS. 3c-3d, the minimum cut algorithm determines that node I3 may be removed from dependence chain 1 resulting in a potential performance and energy optimization. In other words, the computation of node I3 is potentially expensive, and after the optimization, I3 is to be run only on one processing element instead of on two processing elements. As a result, in flow 215, node I3 is removed from dependence chain 1, as illustrated in FIG. 3d.

However, even though execution of I3 is potentially expensive and removal from dependence chain 1 optimizes performance of dependence chain 1 and the power/energy consumption of processing element 1, i.e. the processing element dependence chain 1 is to be executed upon further overhead may be incurred to ensure program consistency. Remember that dependence chain 1 was parallelized from a single-threaded application, i.e. the code region from FIG. 3a. As a result, node I4 depends on output from node I3. Therefore, in one embodiment, communication is inserted, which when executed, is to fulfill the dependency of node I4 on removed node I3. This communication is represented in FIG. 3d, where the output of node I3 executed on processing element 2 is communicated to node I4 on processing element 1.

As an example, communication includes a send operation inserted in dependence chain 2, when executed on processing element 2, to send output data from node I3 to processing element 1 and a receive operation inserted in dependence chain 1, when executed on processing element 1, to receive the output data from node I3 sent by the send operation executed on processing element 2. To further illustrate, assume node I3 ends with a branch instruction. Here, the receiver side, i.e. processing element 1 executing dependence chain 1, may still need to execute a branch instruction after the branch condition is received. If the branch is highly predictable, however, the send operation may be combined with the branch on the sender side, i.e. dependence chain 2 to be executed on processing element 2, as a "branch&send target" operation. The branch&send target operation, when executed, sends the branch target when the target is predicted.

Within dependence chain 1, a receive operation may be combined with the branch as a "receive&branch" operation, which when executed, jumps to the received target without branch prediction. This allows processing element 1 to run in parallel with the branch resolution in processing element 2 to potentially improve performance and parallelism, instead of performing branch resolution on both processing elements.

Turning to FIG. 4 an embodiment of a flow diagram for a method of optimizing a parallelized code segment is illustrated. Note that some of the flows illustrated in FIG. 4 may be discussed in reference to illustrative examples depicted in FIGS. 3a-3d. In flow 405, code segments are parallelized to be run on multiple processing elements. Parallel code may include replicated segments of a single-threaded application, as well as inherent multi-threaded applications having duplicated instructions among multiple threads.

In one embodiment, optimization of parallelized code regions is performed on a per code segment or per processing element basis. As a result, optimization may be performed for any number of the replicated code segments. For example, where multiple parallel code segments/regions are to be optimized, the code segments are optimized in a decreasing order of their respective workload. In other words, higher workload parallel code regions are optimized first before lower workload parallel code regions.

Once the parallelized code segment to be optimized is identified, then in flow 410, a workload for each node of the code segment is determined. As stated above, a node may include a single operation, single instruction, a group of instructions, a dependence chain, a sub-dependence chain, a branch, a loop, or a region of code. As a result, a workload may include any representation of a cost associated with a node, such as an execution time, an instruction count, an execution count of the node, a combination thereof, or any other known method of representing a cost of instructions. Note each of those metrics, such as an execution time, may be measured in different manners as well. For example, an execution time potentially includes an amount of execution cycles or an actual amount of time for a node to be executed.

As an example, a workload of a node includes an average execution time of the node multiplied by a number of times the node is to be executed, i.e. an execution count. Here, determining an execution time and an execution count for a node may be performed utilizing any known method, such as simulation, actual measured execution time, program profiling analysis, or estimation. For example, an execution time of a node and the number of times a node is to be executed may be determined through program profiling analysis, i.e. keeping a count of a number of times the node is executed during actual execution of the program for profiling, as well as an average amount of time the node took to execute each time.

In addition to workload cost for each node in the code segment, a communication cost for intra-dependent nodes or edges of the code segment are determined in flow 415. In other words, communication costs are determined between producer nodes to manipulate or update data and consumer nodes to read or otherwise utilize that data if one of the nodes was removed. For example, from FIG. 3c, it can be seen that I4 depends from I1, I2, and I3, as described above. Here, I1, I2, and I3 are producer nodes and I4 is a consumer node; therefore, these nodes and the edges that connect them within dependence chain 1 are referred to as "intra-dependent" nodes and edges, as they exist within dependence chain 1 and illustrate a dependency. As a result, a communication cost is determined for the edge between nodes I3 and I4, if node I3 were removed, as illustrated in FIG. 3d.

Similar to a workload determination, an average communication cost may be expressed in any known manner of determining a cost associated with communication of information. As an example, a communication cost between I3 and I4 includes a number of times the communication is to occur, i.e. the amount of times the intra-dependence edge is traversed and would have to be replaced with communication, multiplied by the average amount of communication cost per occurrence. As above, the factors may be determined in any known fashion, such as simulation, actual measured execution time, program profiling analysis, or estimation.

For example, the number of times communication is to occur may be determined based on program profiling analysis. Here, assume a dependence chain includes node A (nA) depending from node B (nB) and when the dependence chain is executed before optimization for profiling, i.e. nA and nB not removed, the execution trace includes nB→nB ➔ nA→nA→nB→nB ➔ nA→nA. As a result, the actual count for nA is four and the count for nB is four, which may utilized for workload determination. Here, the workload of nB may be a count (4) multiplied by an average amount of execution time for nB (100 cycles) equaling 400 cycles. In contrast, the edge between node B and node A only occurs twice. As a result, if node B is replaced, then the communication between node B and node A is determined to occur twice according to the program profile.

Furthermore, in this example, assume the communication time between processing element 2 and processing element 1 is estimated based on a communication topology between processing element 1 and 2, as well as an amount of data to be transferred. As a result, if a bus directly connects processing element 1 and 2 and the data is a width of the bus, i.e. capable of being transferred at once, the estimation of communication of the data may be small, as compared to a topology requiring data to be pushed and pulled from a cache memory. Here, assume the communication time to transfer data from node B executed on processing element 2 to be received by node A on processing element 1 includes 100 cycles, then the communication cost between node B and node A, if node B were removed from the dependence chain, includes the number of times the communication is to occur (2) multiplied by the communication time (100 cycles) equaling 200 cycles. Essentially, it is more efficient to execute node B in only one processing element, since its workload is 400, while communication overhead added by removing node B is only 200.

Yet, the determination of the trade-off between workload and communication cost in more complex code segments may not be so straightforward. Therefore, in one embodiment, a network flow for the code segment is maintained in flow 420. An embodiment of maintaining a network flow is illustrated and described in more detail below in reference to FIG. 5. However, even though the network flow is depicted in a graphical format, often a network flow maintained by software is maintained utilizing data structures. As a result, a simplified illustrative example of maintaining a network flow is now described. First, a plurality of nodes are identified for the code region. Based on the granularity of the nodes, i.e. a sub-dependence chain or a single instruction granularity, each basic element of the granularity is associated with a node. Therefore, if nodes are to be at a single instruction granularity, then a node is created for/associated with each instruction in the code region.

In addition, a source node and a sink node are added to the flow network. In one embodiment, a cut of the flow network is later performed, such that the cut associates nodes with two sets, i.e. the source set that is to remain in the source code region and the sink set that is to be removed from the code region. Note at this point, the nodes for instructions, the source node, and the sink node are created in the network flow but not interconnected.

Consequently, the source node is connected to non-duplicated nodes of the code segment with edges associated with maximum values, i.e. maximum value edges. Essentially, a minimum value of summed edges sliced during a subsequent cut is desired. Therefore, to ensure non-duplicated nodes are not removed, the maximum value is assigned to these edges. As illustrated later, a maximum value is represented by an infinity symbol, but in practicality, may include a large enough value to ensure these edges are not sliced during application of a minimum cut.

Similarly, each node is connected to the sink node with edges associated with workload values, i.e. workload edges. A workload value may be obtained through any known method, such as the example described above where an average execution count is multiplied by the average execution time of the node. Workload edges represent a workload value, such that if a workload edge is sliced, the workload of the node remains in the source code segment. So far the source node has been connected to non-duplicated nodes and each node has been connected to the sink node. Yet, each of the nodes representing intra-dependencies between themselves have not been interconnected.

Therefore, intra-dependent nodes, i.e. nodes that depend on each other, such as producer and consumer nodes, are interconnected with edges associated with communication values, i.e. intra-dependent or communication edges. As stated above, a communication value may be obtained and represented in any manner. Here, a communication edge, if cut, represents a communication cost with removing a node from the source code segment and placing it in the sink set. In other words, the cost of communicating data across processing elements to fulfill dependencies.

Once the flow network is built and maintained, in flow 425, a minimum-cut algorithm is applied to determine nodes to be removed. Essentially, the minimum cut includes a cut to find a "path of least resistance" through the edges of the flow network. As an example, the minimum cut's objective is to determine a minimum summation value of workload, communication, and maximum edges sliced by the cut. As there may be a large number of paths through the flow network, any method of determining a minimum path/cut may be utilized. As an illustration, a trial and error method is utilized, where cuts are made and edges sliced by the cuts are summed, such that the lowest sum cut is utilized as the minimum cut. Alternatively, an intelligent cut based on the lowest value edges is utilized to find the minimum cut.

The cut creates a source node set and a sink node set, where nodes associated with the source node set are to remain in the code region and the nodes associated with the sink node set are to be removed. Therefore, in flow 430 the nodes to be removed are removed. To ensure proper sequential ordering for data dependencies, communication is inserted for the nodes removed in flow 435. If a producer node is removed from the code segment, then a receive-type operation is inserted for the corresponding consumer nodes in the code segment to receive data from the duplicated producer node being executed in another replicated code segment. Similarly, a corresponding send operation is inserted in the other replicated code segment. Inversely, a send operation may be inserted in the code segment and a corresponding receive operation in another replicated code segment.

Figure 6A:
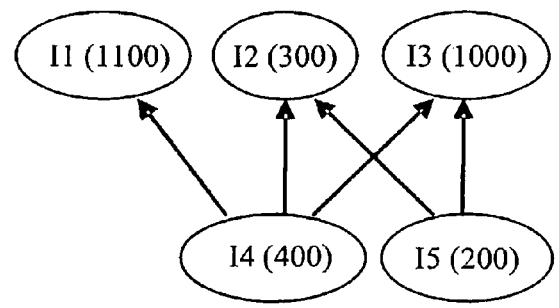
FIG. 6a illustrates an embodiment of the dependence graph from FIG. 3b with associated workloads.

Referring to FIG. 5 an embodiment of a flow diagram for maintaining a flow network for a dependence chain is illustrated. The flows of FIG. 5 are discussed in reference to an illustrative example depicted in FIGS. 6c-d. Therefore, the background context of FIG. 6a is discussed. As depicted, FIG. 6a illustrates the dependence graph from FIG. 3b, which was based on the code segment/dependence chain illustrated in FIG. 3a, with the addition of associated workloads. Note the total workload of the portrayed dependence chain includes the sum of the workloads of the nodes, i.e. 1100+300+1000+400+200=3000. Furthermore, the dependence graph is a single dependence chain that is not capable of being executed in parallel, i.e. the workload of 3000 is executed on a single processing element.

Figure 6B:
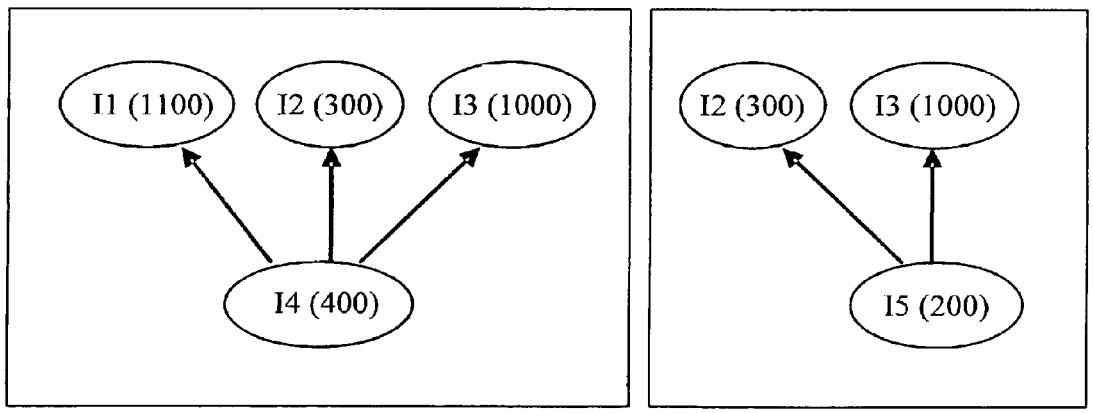
FIG. 6b illustrates an embodiment of the dependence graph from FIG. 3c with associated workloads.

In contrast, FIG. 6b illustrates an embodiment of the dependence graph from FIG. 3c, after the dependence chains have been replicated/divided. Here, processing element 1 has a total workload of 1100+300+1000+400=2800 and processing element 2 has a total workload of 300+1000+200=1500. From the perspective of processing element 1, the workload has been reduced from 3000 to 2800, i.e. a performance gain by a factor of 3000/2800=1.07. Yet, both nodes I2 and I3 are replicated on both processing elements. In other words, a workload of 1300 is replicated on both processing elements, which assuming a relationship between the amount of workload and power/energy consumption, results in an increase of power/energy consumption by a factor of 1.43.

Figure 6C:
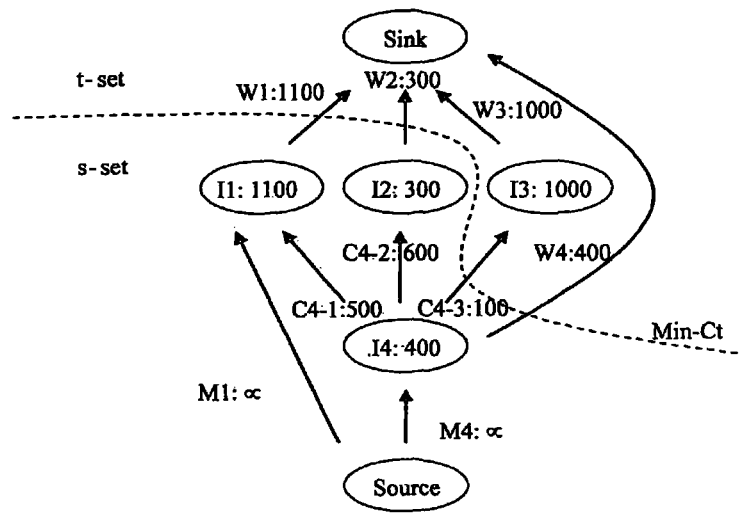
FIG. 6c illustrates an embodiment of a network flow for the code region associated with processing element one in FIG. 6b.

Therefore, in one embodiment, a minimum cut algorithm of a flow network is performed to determine nodes to be removed. In flow 505, a node is created in the flow network for each instruction of the dependence chain. As can be seen in FIG. 6c, nodes I1, I2, I3, and I4 are present. Note that this optimization, in one embodiment, is performed on a per code segment or per processing element basis. Here, processing element 1 with the first replicated dependence chain is being optimized, and as a result, I5 does not appear in the flow network as it does not exist within that code segment.

In flow 510, a source node and a sink node are created in the flow network, as presented in FIG. 6c. Maximum capacity value edges from the source node to non-duplicated nodes of the flow network are created in flow 515. Here, to ensure non-duplicated instructions are not removed, the edges from the source node to the non-duplicated instructions are created with large values to ensure they are not sliced during a minimum cut. In FIG. 6c the source is connected to node I4 and I1 in such a manner with a represented infinity symbol, since they are not duplicated in the second replicated dependence chain on processing element 2.

In flow 520, workload edges associated with workload costs from the nodes of the dependence chain to the sink node are created. These workload edges represent the workload to remain in the dependence chain if they are sliced by the cut. As illustrated in FIG. 6c, each node I1, I2, I3, and I4, is portrayed with edges to the sink node associated with their corresponding workload values, i.e. 1100, 300, 1000, and 400, respectively.

Furthermore, in flow 525, communication value edges associated with communication costs from each producer node of the plurality of nodes to each consumer node of the plurality of nodes are created. In other words, intra-dependence edges between the nodes are created with communication costs that represent a communication cost associated with a dependency node being removed. Here, I4 is connected with I3, I2, and I1 with communication costs 100, 600, and 500, which represents the communication cost associated with removing I3, I2, and I1, respectively.

As stated above, workload values and communication values may be obtained in any manner. Furthermore, although the flow network in FIG. 6c includes a diagram for convenience and understanding, the flow network is to be maintained by software, such as compiler or other code. Therefore, a textual representation, such as usage of data structures, to represent the flow network and the minimum cut discussed below may be utilized. A non-exhaustive list of basic exemplary data structures that may be utilized include arrays, linked-lists, trees, buffer, table, hash table, stack, queue, etc.

After the network flow is built/created, then in flow 530, a minimum cut of the flow network is performed to determine an instruction to remove from the first replicated dependence chain to be executed on processing element 1. As stated above, a minimum cut includes a cut through edges of the flow network such that a minimum summation value of the edges sliced by the cut are obtained. In FIG. 6c, the minimum cut is represented by the dashed line. Note the edges cut include: (1) the workload edge from I1 to the sink (1100)+the workload edge from I2 to the sink (300)+the communication edge from I4 to I3 (100)+the workload edge of I4 to the sink (400)=1900 minimum cut value. In this instance, no other cut of edges in FIG. 6c will result in a lower cut value than 1900, i.e. representing the minimum cut.

As can be seen, the minimum cut line creates two sets, i.e. a sink set with node I3 and a source set with nodes I1, I2, and I4. As a result, nodes I1, I2, and I4 are to remain in the first replicated dependence chain on processing element 1, while node I3 is to be removed. As I4 depends from I3, communication is inserted in flow 535 to replace the functionality of executing I3 on processing element 1, i.e. fulfill the dependency. Here, the communication consists of an operation to transmit the I3 data from processing element 2 to a receive operation inserted in the first dependence chain on processing element 1 for I4.

Figure 6D:
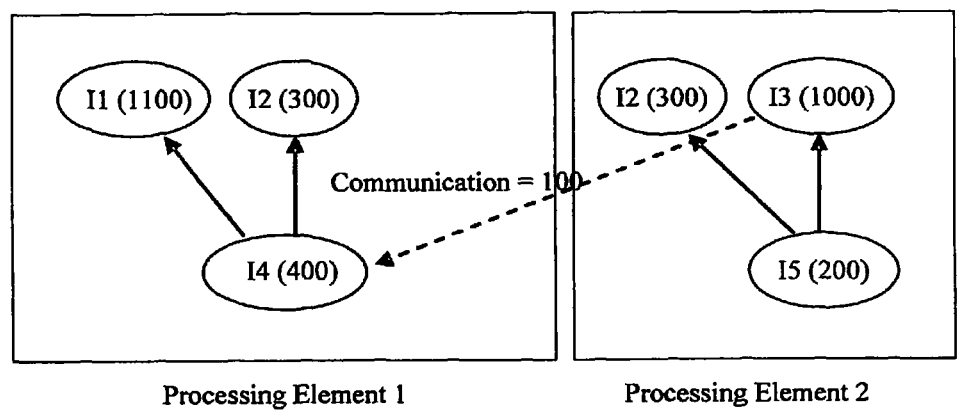
FIG. 6d illustrates an embodiment of a dependence graph for optimizing the code region associated with processing element one in FIG. 6b based application of a minimum cut algorithm of the network flow depicted in FIG. 6c.

An illustration of the optimization is depicted in the dependence graph of FIG. 6d. Here, the remaining workload on processing element 1 includes I1 (1100)+I2 (300)+I4 (400)+communication cost (100)=1900, i.e. a removal of the workload of I3 (1000) less the communication value. Note this is potentially a conservative, as I3 may be executed in parallel on processing element 2 negating the effective communication cost. Therefore, with a workload of 1900 the improvement from the sequential single-threaded program becomes a gain by a factor of 3000/1900=1.58. Note the 1.58 factor performance gain is larger than the pure maximum parallelization of the two dependence chains with non-optimized duplicated instructions resulting in only a 1.07 factor performance gain.

Furthermore, the duplicated instructions executed are reduced from I3 (1000) and I2 (300)=1300 to only I2 (300)+the communication value (100)=400. As a result, the energy/power consumption is reduced form the 1.43 factor associated with non-optimized duplication to a factor of 1.13 for optimized removal of instructions and replacement with communication. Consequently, optimization of parallelized code in such a fashion potentially results in a performance gain and power/energy consumption savings.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An article of manufacture storing program code on a non-transitory computer readable medium which, when executed by a machine, causes the machine to perform the operations of:

performing a minimum flow cut of a flow network to determine at least a node of the flow network to remove from a code region at a time selected from a group consisting of dynamically during runtime of the machine, statically during compilation of application code, and a combination of statically during compilation and dynamically during runtime of the machine;

before removing a duplicate node, determining the cost of removing the duplicate node including the cost of communicating between nodes if the duplicate node is removed, wherein a node is an instruction, a group of instructions, or a sub-dependence chain of instructions; and based on said cost of removing the duplicate node, deciding whether to remove the duplicate node, and removing the duplicate node as a result of the deciding.

2. The article of manufacture of claim 1 including identifying a plurality of nodes for a code region in a flow network.

3. The article of manufacture of claim 2, wherein each of the plurality of nodes are selected from a group consisting of an instruction, a group of instructions, a sub-dependence chain of instructions.

4. The article of manufacture of claim 2 including adding a source node and a sink node to the flow network.

5. The article of manufacture of claim 4 including connecting the source node to non-duplicated nodes of the plurality of nodes with edges associated with maximum values.

6. The article of manufacture of claim 5 including connecting the plurality of nodes to the sink node with edges associated with workload values.

7. The article of manufacture of claim 6 including inter-connecting intra-dependent nodes of the plurality of nodes with edges associated with communication values.

8. The article of manufacture of claim 6, including cutting through edges of a flow cut network to obtain a minimum summation of cut edges associated with workload values and communication values.

9. The article of manufacture of claim 1, wherein the program code which, when executed by a machine, further causes the machine to perform the operations of:

inserting a first communication operation in the code region and a second communication operation in a replicated code region, the first communication operation, when executed on a first processing element of the machine, is to receive output data, wherein the second communication operation, when executed on a second processing element of the machine, is to generate the output data.

10. A method comprising:

applying a minimum-cut algorithm to a flow network to determine removable nodes from a code segment;

determining a minimum value of a sum of maximum value edges, workload value edges, and communication cost value edges to slice with a cut;

performing the cut to form a source set of nodes associated with the source and a sink set of nodes associated with the sink, and determining the removable nodes from the code segment include the sink set of nodes;

before removing a duplicate node, determining, using a processor, the cost of removing the duplicate node including the cost of communicating between nodes if the duplicate node is removed, wherein a node is an instruction, a group of instructions, or a sub-dependence chain of instructions; and based on said cost of removing the duplicate node, deciding, using the processor, whether to remove the duplicate node, and removing the duplicate node as a result of the deciding.

11. The method of claim 10, further comprising:

inserting communication operations in one code segment to receive output data from the removable nodes in another code segment.

12. The method of claim 10, wherein each node includes an average workload execution time of each node multiplied by a number of times each node is to be executed.

13. The method of claim 12, wherein the average execution time of each node and the number of times each node is to be executed are each individually selected from a group of techniques consisting of program profiling analysis, estimation, and actual execution.

14. The method of claim 10, wherein a communication cost for each intra-dependence between nodes of the code segment includes an average communication time multiplied by a number of times each intra-dependence is to be executed.

15. The method of claim 12, wherein an average communication time is estimated based on a topology of a communication path and an amount of data to be communicated, and wherein the number of times each intra-dependence is to be executed is based on program profiling analysis.

16. The method of claim 12, wherein creating a flow network for the code segment based on the workload for each node of the code segment and a communication cost for each intra-dependence edge between nodes of the code segment comprises:

adding a source node and a sink node to the flow network:

connecting the source node to non-duplicated nodes of the code segment with maximum value edges;

connecting each of the nodes of the code segment to the sink node with workload value edges; and inter-connecting each of the intra-dependent nodes of the code segment with communication cost value edges.

17. The article of manufacture of claim 1 including determining the extra cost of executing duplicate nodes and deciding whether to remove a duplicate node based on the cost and the extra cost.

18. The method of claim 10 including determining the extra cost of executing duplicate nodes and deciding whether to remove a duplicate node based on the cost and the extra cost.

* * * * *